(12) United States Patent
Grosskopf et al.

(10) Patent No.: US 6,441,533 B1
(45) Date of Patent: Aug. 27, 2002

(54) ELECTRIC MOTOR WITH COMMUTATOR

(75) Inventors: Reimar Grosskopf, Kriens; Frank Neumann, Emmenbruecke, both of (CH)

(73) Assignee: Interelectric AG, Sachseln (CH)

( * ) Notice: Subject to any disclaimer, the term of this patent is extended or adjusted under 35 U.S.C. 154(b) by 0 days.

(21) Appl. No.: 09/647,725

(22) PCT Filed: Feb. 3, 2000

(86) PCT No.: PCT/EP00/00855

§ 371 (c)(1),
(2), (4) Date: Nov. 24, 2000

(87) PCT Pub. No.: WO00/46899

PCT Pub. Date: Aug. 10, 2000

(30) Foreign Application Priority Data

Feb. 5, 1999 (DE) .......................................... 199 04 728

(51) Int. Cl.[7] .......................... H02K 13/00; H02K 13/10
(52) U.S. Cl. ................ 310/244; 310/251; 310/40 MM; 310/239
(58) Field of Search .......................... 310/40 MM, 239, 310/251, 252, 242, 244

(56) References Cited

U.S. PATENT DOCUMENTS 3,145,316 A    8/1964   Page .......................... 310/246
4,868,433 A    9/1989   Fujisaki ................. 310/40 MM
6,280,090 B1 * 8/2001   Stephens et al. ............ 384/284

FOREIGN PATENT DOCUMENTS

| DE | 9010578.8 | 10/1990 |
| DE | 9112104.3 | 3/1993 |
| DE | 29605114  | 8/1996 |
| EP | 538620    | 4/1993 |
| FR | 2565042   | 11/1985 |

* cited by examiner

Primary Examiner—Nestor Ramirez
Assistant Examiner—Judson H. Jones
(74) Attorney, Agent, or Firm—Marshall, Gerstein & Borun

(57) ABSTRACT

An electric motor comprising a commutator and lever brushes which resiliently press thereagainst and are pivotable about a pivot axis, a connection line which extends in a direction perpendicular to the pivot axis between the center point of a brush contacting surface and the pivot axis being tangential to the outer surface of the commutator. Such a brush assembly is to be made smaller in size. Each lever brush comprises a bearing bush rotatably arranged to be coaxial to the pivot axis, as well as a shaped body which is made from a conductive material and is firmly connected to the bearing bush. The shaped body forms the brush contacting surface and has a connection point which is in direct electrical contact with the brush contacting surface for electrically connecting the lever brush. The bearing bush is made from a material which is more stable than the shaped body.

11 Claims, 2 Drawing Sheets

ELECTRIC MOTOR WITH COMMUTATOR

FIELD OF THE INVENTION

Background of the Invention

The present invention relates to an electric motor comprising a commutator and lever brushes which resiliently press thereagainst and are pivotable about a pivot axis, a connection line which extends in a direction perpendicular to the pivot axis between the center point of a brush contacting surface and the pivot axis being tangential to the outer surface of the collector.

Most of the time, electric motors of such a design are small sized motors used for the most different applications. A generic brush arrangement of an electric motor is described in German utility model 29605114. In this arrangement two opposite lever brushes press with their brush contacting portion against the commutator. The lever brushes are formed by a pressed shaped body consisting of graphite with conductive additives. A bearing eye which is put onto a pin provided on the brush cover is arranged opposite to the contact surface end of the lever brushes so that each lever brush is held to be pivotable about a pivot axis. An imaginary connection line between the contact point of the brush contacting surface and the pivot axis of the lever brush is tangential to the outer surface of the commutator. The reason is that such a brush arrangement is suited for both rotational directions. To be more specific, the lever brush should wear down in a uniform manner, independently of the rotational direction. A pigtail which communicates with corresponding terminal contacts is molded into the lever brush during the manufacturing or pressing process. The lever brushes are pressed onto the commutator by means of roll-type springs which are pressed onto the back of the lever brushes. Although such a construction has turned out to be useful, attempts are made to further reduce the size of the arrangement and to enhance miniaturization.

It is therefore the object of the present invention to improve an electric motor of the above-mentioned type, in particular the brush arrangement thereof, with respect to the space needed.

SUMMARY OF THE INVENTION

That object is achieved according to the invention in that each lever brush comprises a bearing bush rotatably arranged to be coaxial to the pivot axis, as well as a shaped body which is formed from a conductive material and firmly connected to the bearing bush and which forms the brush contacting surface and includes a connection point in direct electrical contact with the brush contacting surface for electrically connecting the lever brush, and that the bearing bush consists of a material more stable than that of the shaped body.

Thus, the invention offers the advantage that the rotational direction is still independent, that the connection point is in direct electrical communication with the brush contacting surface and that a bearing bush is used consisting of a more stable material. A more stable material means any material which is better or more durable as to its bearing characteristics than the material of the shaped body. This means that the wall thickness given to the bearing bush may be considerably smaller than the former wall thickness given to the pressed and shaped body in the area of the bearing eye. As a result, the pivot axis of the bearing point can be arranged closer to the commutator and the lever arm length can be reduced. Thanks to the use of a bearing bush consisting of a suitable stable material, wear created at the bearing point can also be reduced considerably. It is thereby possible to design the section of the shaped body which forms the brush contacting surface in such a manner that a wear length that is as great as possible is provided for and the lever brushes can be used for a very long time. The bearing bush can be connected in a suitable manner to the shaped body during the manufacturing process or by subsequent pressing or gluing.

It is true that there are already constructions in which simple graphite pins are held by a lever arm bent from a sheet metal. These, however, have the drawback that the connection point is arranged on the sheet part. Hence, when the connection between lever arm and graphite pin is established, special care must be taken for ensuring an adequate electrical transition. This, however, will entail costs making the whole construction more expensive. Despite the use of a stable bearing bush, the connection point in the present invention is still held on the shaped body and thus in direct electrical contact with the brush contacting surface. Expensive soldering points, or the like, are not needed. Since the bearing bush has a hollow cylindrical shape most of the time, the bush can be embedded into the shaped body at least in part while the shaped body is being produced. The bearing bush is embedded into the molded body over a circumferential angle of >180°, if possible, thereby ensuring a safe anchorage.

Advantageously, the lever brush has a web which is pivotable about the pivot axis and whose face is formed by the brush contacting surface. The height of the web will then substantially determine the wear length of the lever brush, because the brush will normally be used until the web has almost worn down.

The lever brush may comprise a connection nose which is adjacent to the bearing bush and which extends in a direction transverse to the connection line and has the connection point arranged thereon. Since the shaped body can be formed in any desired way, such a connection nose can very easily be mounted thereon. Since the nose is arranged in a direction transverse to the connection line, it can also be adapted to the curvature of the commutator surface so that space can be saved for the connection as well. This means that the connection nose is e.g. bent at the side of the pivot axis which is opposite to the brush contacting surface, i.e. towards the commutator.

Preferably, the connection point is formed by a flexible lead firmly anchored in the shaped body. In particular, a flexible lead which is braided from thin copper wires can very easily be embedded into the shaped body with enough stability. Furthermore, it is sufficiently flexible and establishes a good contact, for example, on contact lugs of the motor connections.

To make sure that a spring element which applies the press force to the lever brush is reliably secured to the lever brush, an undercut which is engaged by the one end of the spring element may be provided in the shaped body. Thanks to the direct engagement of the shaped body, additional components that would make the arrangement more expensive need not be provided for anchoring the spring.

Advantageously, the lever brush may have a circular arcuate back which is concentrically arranged relative to the pivot axis and passes into the undercut, and a roll-type strip spring is guided along in portions on the back and engages with its unrolled end into the undercut and is arranged with its rolled end in a pocket of a housing section. Although it is possible to use other spring elements, such as torsion springs, the roll-type strip spring has turned out to be very well suited, in particular, because of the spring excursion varying with the wear of the brush. In particular in the new state of the lever brush, the unrolled end section of the roll-type strip spring substantially rests in planar fashion on the back of the lever brush, thus hardly occupying more space in the extended position than later in the retracted position.

Since the roll-type strip is guided along the back of the lever brush, the rolled end of the roll-type strip spring can also be arranged in a very space-saving manner and very close to the commutator, which results in a further reduction of the size.

BRIEF DESCRIPTION OF THE DRAWINGS

An embodiment of the present invention shall now be explained in more detail with reference to a drawing, in which.

DETAILED DESCRIPTION OF THE PREFERRED EMBODIMENT

Figure 1:
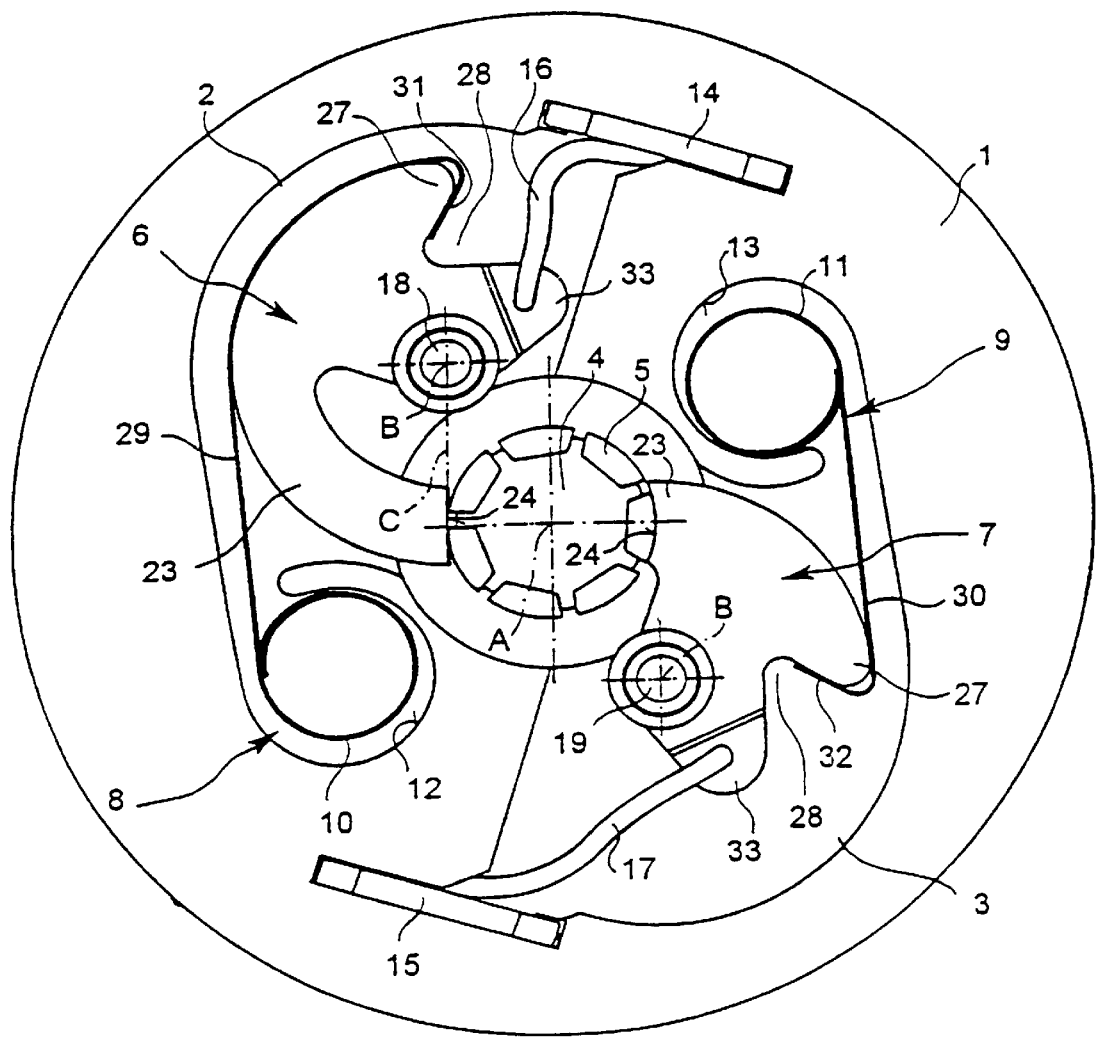
FIG. 1 is a front view of a brush arrangement of an electric motor according to the present invention, the left brush being shown in its new state and the right brush in a worn state.
Figure 3:
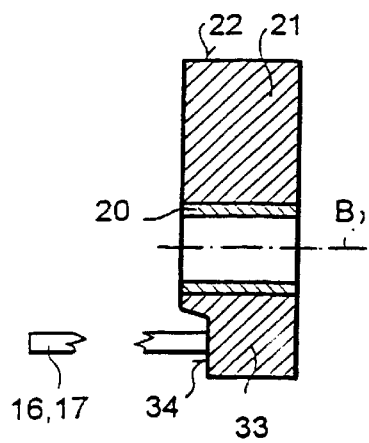
FIG. 3 shows the lever brush of FIG. 2, cut along line 111—111 of FIG. 2.
Figure 2:
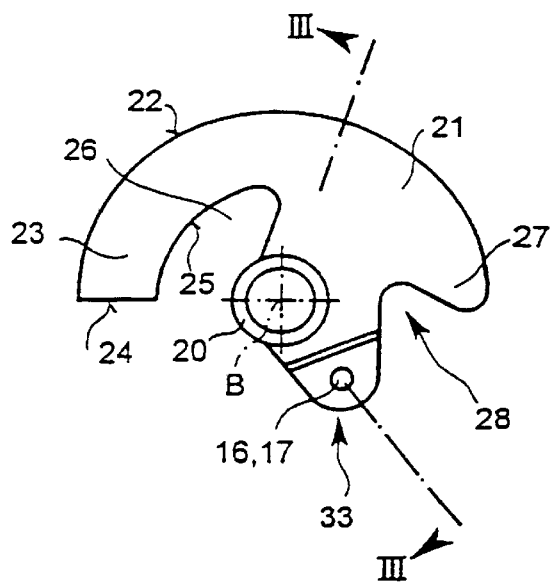
FIG. 2 is a front view of a lever brush.
Figure 5:
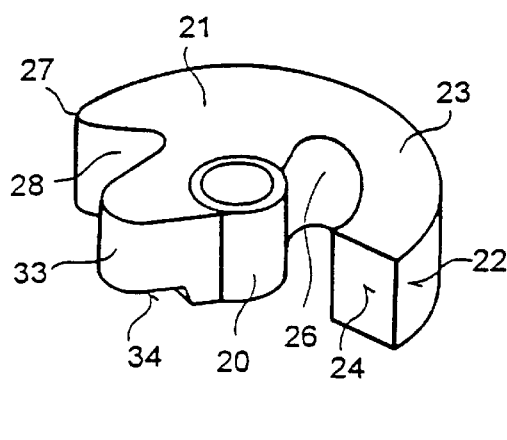
FIG. 5 is a perspective rear view showing the lever brush of FIG. 4.
Figure 4:
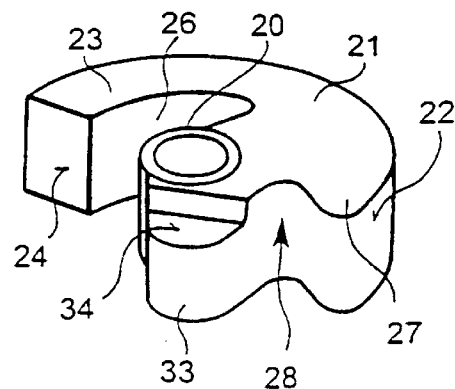
FIG. 4 is a perspective front view showing the lever brush of FIG. 2.

FIG. 1 shows a brush cover 1 which is adapted to the outer contour of the electric motor and comprises shaped portions 2 and 3 having provided therein the brush arrangement which will be described in more detail hereinafter. Centrally rotating in the brush cover 1 is the collector shaft 4 of a commutator with lamellae 5 that are arranged thereon and isolated from one another. The lamellae 5 are shaped on their outer circumference such that they form a cylindrical surface which is respectively interrupted between the lamellae 5.

Two lever brushes 6 and 7 that are each resiliently pressed onto the lamellae 5 via a roll-type strip spring 8 and 9, respectively, press against the lamellae 5 in diametrically opposed fashion relative to axis A. The roll-type strip springs are arranged with their rolled-up ends 10 and 11 in a respective pocket 12 and 13 of the shaped portions 2 and 3. The pockets 12 and 13 surround the associated roll-type strip springs 8 and 9 such they can only be inserted thereinto in a direction parallel to axis A.

Diametrically opposed terminal lugs 14 and 15 which together with flexible leads 16 and 17 ensure a connection of the lever brushes 6 and 7 extend through the brush cover 1. The flexible leads 16 and 17 preferably consist of a thin braided copper wire and are welded to the terminal lugs 14 and 15. They have a length sufficient for electrically connecting the lever brush 6 or 7 to a satisfactory degree - even in the worn state thereof.

The lever brushes 6 and 7 are each supported to be pivotable about a pivot pin 18 and 19, respectively, and thus about a pivot axis B. The pivot pins 18 and 19 have an outer cylindrical bearing surface.

With reference to FIGS. 2 to 5, the structure and shape of the lever brushes 6 and 7 shall now be explained in more detail. The lever brushes 6 and 7 consist essentially of a hollow cylindrical bearing bush 20, a shaped body 21 firmly connected thereto, and a flexible lead 16, 17 embedded in the shaped body. The shaped body 21 consists of pressed graphite powder having embedded therein copper and/or silver portions. The connection between the bearing bush 20, which consists of a firmer material, and the shaped body 21 can be established while the shaped body 21 is being produced or at a later time, e.g., by gluing. As can particularly clearly be seen in FIG. 2, the shaped body 21 surrounds the bearing bush 20 by more than 180°, resulting in a firm anchorage of the bearing bush 20. Although such a partial embedding of the bearing bush 20 is fully sufficient, it may also be embedded therein entirely.

The lever brushes 6, 7 have an outer cylindrical back 22 which extends over an angular range of about 180° in the new state of the lever brushes 6 and 7. An arcuate web 23 of a substantially uniform thickness whose face 24 is simultaneously forming the contact surface of the lever brush 6, 7 extends approximately over an angle of 90°. The web 23 is thus laterally defined by part of the back 22 and by an inner surface 25 of an also outer cylindrical curvature. A recess 26 is thereby created between the web 23 and the bearing bush 20. The arcuate length of the web 23 defines the amount by which the lever brush 6, 7 is allowed to wear. That is why the web 23 can also be pivoted concentrically about axis B. At the opposite side, the shaped body 21 has a first nose 27 which passes into a V-shaped undercut 28. A look at FIG. 1 will reveal that the unrolled end 29, 30 of the roll-type strip spring 8, 9 encompasses the nose 27 with a hook-like attachment 31, 32 and is anchored in the undercut 28. As for the left roll-type strip spring 8 that has not been worn yet, it can very clearly be seen how the spring rests on the back 22 of the lever brush 6 over an angular range of at least 90°.

Next to the recess 28, a second nose 33 is provided on the shaped body 21. The nose 33 serves as a connection point. The flexible lead 16 and 17, respectively, is embedded in said nose. To avoid a situation where the flexible lead 16, 17 requires additional lateral installation space, the second nose 33 has a step 34, whereby the flexible lead 16, 17 can be bent over in a space-saving manner. Since the flexible leads 16 and 17, respectively, are embedded in the second nose 33, they are in direct electrical contact with the contact surface 24 through the shaped body 21. The second nose 33 is bent downwards, so that it occupies an angle of about 125° relative to the brush contacting surface 24 in the new state of the lever brushes 6, 7. As a result, the connection point can be arranged closer to the terminal lug 15, whereby objectionable effects of the flexible lead 16/17 on the movability of the brush are reduced and advantages are created during assembly.

As can also be seen in FIG. 1, an imaginary connection line C is tangential to the outer circumference of the lamellae 5 (i.e., extending in a direction vertical to the assigned radius) at the contact point of the contact surface 24 with the lamellae 5 and the pivot axis B. This makes the rotational direction independent because no preferred direction is given for the brushes. Since the contact surface 24 adapts to the outer circumference of the lamellae 5 very rapidly, a contact point of the contact surface 24 with the lamellae 5 is assumed for this study. Said point is located in the center of the contact surface 24 because of the independence of the rotational direction.

The mode of operation of the invention shall now be explained in more detail.

On account of the spring action of the roll-type strip springs 8 and 9, respectively, and their tendency to roll up, the lever brushes 6, 7 are pressed with their contact surfaces 24 onto the lamellae 5 with a predetermined force. The lever brushes 6, 7 are pivotably arranged with their bearing bushes 20 on the pivot pins 18 and 19, respectively. On account of the stable, e.g. metallic, material, the bearing bushes 20 exhibit a high stability with respect to said intended application. Moreover, they can be arranged relatively close to the collector shaft 4 with the lamellae 5. In the course of time the contact surface 24 will wear down to fit the lamellae 5, and the web 23 will be worn during use due to the rotation of the collector shaft 4 of the electric motor. Thanks to the clever arrangement of the roll-type strip spring 8 and 9, respectively, a permanent spring force is applied to the lever brushes 6 and 7.

A relatively long web 23 can be formed due to the design of the lever brushes 6 and 7, so that a longer service life can be achieved in spite of a reduced constructional size of the lever brushes 6, 7. The distance of the contact surface 24 to the pivot axis B can be reduced in this variant.

We claim:

1. An electric motor comprising in combination a commutator, lever brushes (6, 7) which resiliently press against said commutator and are pivotable about a pivot axis (B), a connection line (C) which extends in a direction perpendicular to said pivot axis (B) between the center point of a contact surface (24) of said brush and said pivot axis (B) being tangential to the outer surface of said commutator, each of said lever brushes (6, 7) comprises a bearing bush (20) rotatably arranged to be coaxial to said pivot axis (B), as well as a shaped body (21) which is made from a pressed conductive powder material and firmly connected to said bearing bush (20) and which forms the brush contacting surfaces (21) and includes a connection point (33) which is in direct electrical contact with said brush contacting surface (24) for electrically connecting said lever brush (6, 7), and that said bearing bush (20) consists of a more stable material than said shaped body (21).

2. The electric motor according to claim 1, wherein said lever brush (6, 7) comprises a web (23) which is pivotable about said pivot axis (B) and whose front face (4) forms said brush contacting surface.

3. The electric motor according to claim 1 and an undercut (28) which is engaged by the one end (31, 32) of a spring element (8, 9) is molded into said shaped body (21).

4. The electric motor according to claim 3, wherein said lever brush (6, 7) has a circular arcuate back (22) which is arranged to be concentric to said pivot axis (B) and which passes into said undercut (28), and that a roll-type strip spring (8, 9) is guided in sections along the back (22) and engages with its unrolled end (29, 31, 30, 32) into said undercut (28) and is arranged with its rolled end (10, 11) in a pocket (12, 13) of a housing section.

5. The electric motor according to claim 1, wherein said pressed conductive powder material is graphite.

6. The electric motor according to claim 1, wherein said pressed conductive powder material includes graphite with conductive additives.

7. The electric motor according to claim 6, wherein said conductive additives include silver.

8. The electric motor of claim 6, wherein said conductive additives include copper.

9. The electric motor of claim 1, wherein said bearing brush is made of a metallic material.

10. An electric motor comprising in combination a commutator, lever brushes (6, 7) which resiliently press against said commutator and are pivotable about a pivot axis (B), a connection line (C) which extends in a direction perpendicular to said pivot axis (B) between the center point of a contact surface (24) of said brush and said pivot axis (B) being tangential to the outer surface of said commutator, each of said lever brushes (6, 7) comprises a bearing bush (20) rotatably arranged to be coaxial to said pivot axis (B), as well as a shaped body (21) which is made from a conductive material and firmly connected to said bearing bush (20) and which forms the brush contacting surfaces (21) and includes a connection point (33) which is in direct electrical contact with said brush contacting surface (24) for electrically connecting said lever brush (6, 7), and that said bearing bush (20) consists of a more stable material than said shaped body (21), and wherein said lever brush (6, 7) comprises a connection nose (33) which is adjacent to said bearing bush (20) and which extends in a direction transverse to said connection line (C) and has said connection point located thereon.

11. A The electric motor according to claim 10, wherein said connection point is formed by a flexible lead (16, 17) firmly anchored in said shaped body (21).

* * * * *